No. 859,976. PATENTED JULY 16, 1907.
W. L. PROCUNIER.
YIELDING CHUCK FOR TAPS AND DRILLS.
APPLICATION FILED NOV. 30, 1906.

Witnesses:
Frank Blanchard
M. Gertrude Ady

Inventor:
Wm. L. Procunier
By Burton & Burton
Attorneys

UNITED STATES PATENT OFFICE.

WILLIAM L. PROCUNIER, OF CHICAGO, ILLINOIS.

YIELDING CHUCK FOR TAPS AND DRILLS.

No. 859,976.
Specification of Letters Patent.
Patented July 16, 1907.

Application filed November 30, 1906. Serial No. 345,622.

*To all whom it may concern:*

Be it known that I, WILLIAM L. PROCUNIER, a citizen of the United States, residing at Chicago, in the county of Cook and State of Illinois, have invented new and useful Improvements in Yielding Chucks for Taps and Drills, of which the following is a specification, reference being had to the accompanying drawings, forming a part thereof.

The purpose of this invention is to provide an improved chuck, particularly adapted for holding screw taps, adapted to hold such taps sufficiently for driving them to their work, but to yield their grasp or permit the tap to slip in the chuck when it reaches the bottom of the hole which is being tapped or encounters any other obstruction to its movement which would cause it to break if driven positively. The same expedients adapt the chuck for holding a drill so that the grasp of the chuck on the drill may yield when the resistance approaches too nearly the strength of the tool to make it safe to drive positively.

The improvement consists in the expedients for gripping the tool yieldingly and in the employment of a spring to effect such yielding grip.

It consists also of the specific features of construction for accomplishing the result stated, which will be understood from the specification and which are set out in the specific claims.

Figure 1:
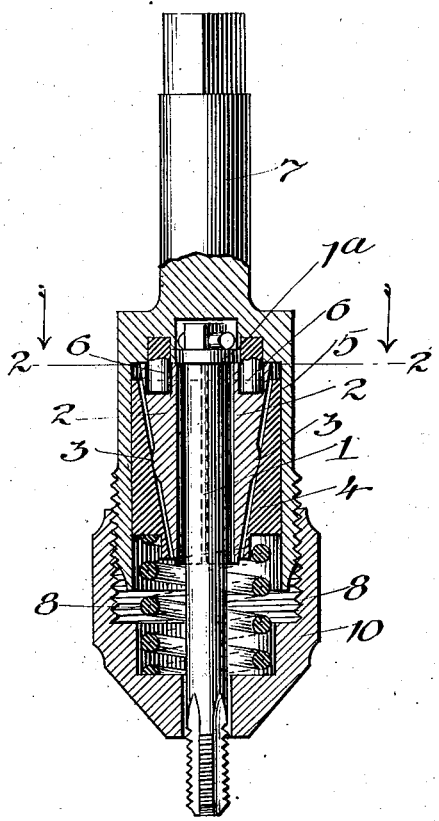
Figure 3:
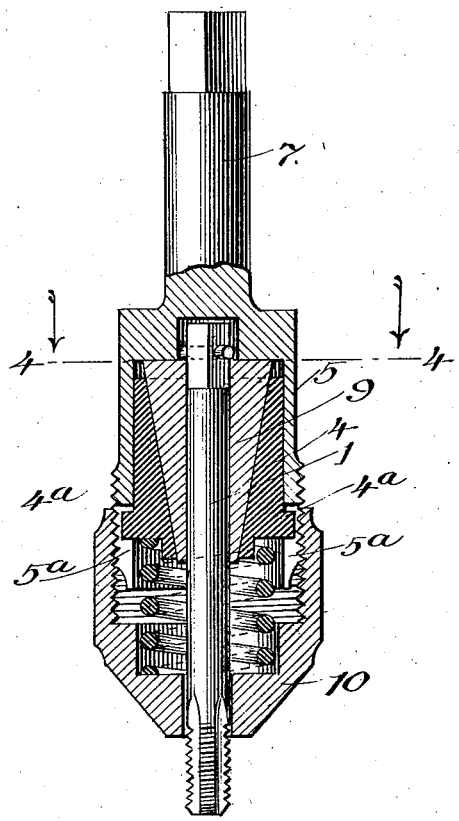
Figure 2:
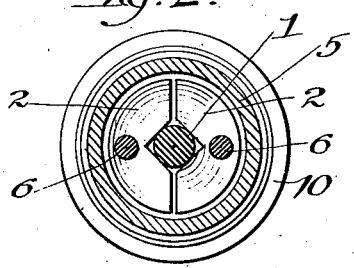
Figure 4:
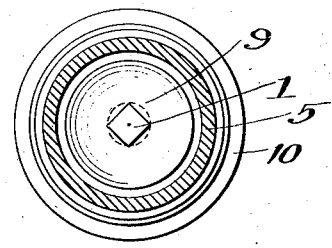

In the drawings:—Figure 1 is an axial section of the chuck embodying my invention showing a tool therein.
Fig. 2 is a section at the line 2—2 on Fig. 1. Fig. 3 is a view similar to Fig. 1 showing a modification of the device. Fig. 4 is a section at the line 4—4 on Fig. 2.

In the form of my invention shown in Figs. 1 and 2, the stem or shank, 1, of the tool to be held is engaged between the two halves, 2, 2, of a gripper, the axle bore of which, consisting of matched grooves in the two halves, seats the tool shank. This gripper is preferably tapered as shown, and it has an annular boss, 3, extending around it half upon each of the two halves of the gripper. 4 is an interiorly conical sleeve within which the two-part gripper, 2, 2, is lodged, the boss, 3, seating upon the conical wall of said sleeve so that any pressure tending to thrust the gripper longitudinally in the sleeve, 1, the smaller end thereof causes the two halves to be crowded together and to grip the tool shank firmly. 5 is the exterior shell of the chuck. The interiorly conical sleeve, 4, is accurately telescoped within it. Two pins, 6, 6, project from the upper end of the cavity of the shell and take respectively into the two members, 2, 2, of the gripper for driving the latter by the rotation of the shell. The shank or stem of the chuck, 7, projects integrally from the upper end of the shell and is provided in the customary manner for holding it in another chuck or driving head of a drill press or lathe. The tool for convenience may be provided at the upper end of its shank with a flange, 1ª, by which it hangs from the upper end of the two-part gripper, 2, 2. This, however, is a matter of convenience only and not essential to the invention. The two-part gripper is stopped at the upper end by the shell, and the interiorly conical sleeve, 4, is pressed upward to force the two parts of the gripper together, by means of a spring, 8, at the lower end of the sleeve stopped there-against and retained and compressed for any desired tension by means of the cap, 10, which is screwed on to the shell at the lower end of the latter, being centrally apertured for the tool. The amount of grip which the device shall have upon the tool is determined by the tension given the spring by screwing up the cap more or less.

It will be seen that the squared upper end of the two-part gripper seating against the similarly squared upper end of the cavity of the shell, 5, operates to fix the axis of the seat for the tool shank and thereby to fix the tool in true position axially with respect to the entire chuck. The purpose of the encompassing annular boss, 3, is to cause the pressure for closing up the gripper parts to be applied in such manner that the tool shank may be gripped the entire length of the gripper, even though the shank be slightly tapered, and to prevent the grip from being limited to a mere line at one end or the other of the gripper, as might be the case if the two elements of the gripper were not to a limited extent free to accommodate themselves to the tool shank by rocking, if necessary, at the seat of the boss on the interiorly conical sleeve. It will be obvious that to such slight extent as might be caused by a taper or inequality in the diameter of the tool shank, such accommodation of the gripper parts to the tool shank may prevent their squared upper ends from seating squarely on the correspondingly squared upper end of the cavity in the shell, but the result would still be to hold the tool substantially axial with respect to the chuck. Preferably, in order that the possibility of variation from axial position may be slight, and yet such as to permit the tool to accommodate itself slightly to the work, I prefer to make the two-part gripper exteriorly conical, conforming substantially and as accurately as possible to the conical taper of the interior wall of the sleeve while retaining the boss described projecting from such conical surface so that it constitutes the actual seat of the one part upon the other in the crowding action for gripping the tool; and any cause tending to defeat the perfectly axial position of the tool can at most only tip it to the extent of the clearance between two conical surfaces,— the outer surface of the two-part gripper and the inner surface of the sleeve. It will be understood that the boss might be omitted and the result obtained solely by the coöperation of the two conical surfaces seating one upon the other; but in that case, if they should not have absolutely the same taper, or if the tool shank should be slightly tapered, and the grooves of the gripper were not conformed to such taper the grip upon the tool would be liable to be confined to a single line at one end or the other of the gripper.

In the form shown in Figs. 3 and 4, the two-part gripper is dispensed with, and instead I provide a conical holder, 9, axially bored to receive the shank of the tool, and at the upper end of the bore having the same reduced and squared to receive the squared upper end of the shank for rotating the tool. This holder amounts to an enlargement of the shank during its use in the chuck, since it is adapted to carry the tool with it in all its movements. The sleeve, 4, is substantially the same in the other form, except that it has lugs, 4ª, engaging slots, 5ª, in the shell, 5, for drawing positively. The sleeve, 4, is pressed up by the spring, 8, as in the other form, the tension of the spring being governed by the adjustment of the cap as in the other form. In the first form, when the resistance to the tool becomes too great, its shank will slip in the two-part gripper whereat the grip is determined by the tension of the spring pressing the gripper elements up and so crowding them together by reason of the taper of the sleeve into which they are thus pressed. In the second form, when the resistance becomes too great for the safety of the tool, the conical holder, 9, will slip at its seat in the interiorly conical sleeve which is pressed up against it by the spring.

I claim:—

1. A tool-holding chuck comprising an outer shell; an interiorly conical sleeve within the shell; an axially apertured holder for the tool shank within the sleeve exteriorly formed for seating on the interior conical surface of the sleeve; a spring which presses the sleeve longitudinally onto the holder, and a stop for the spring mounted on the shell.

2. A tool-holding chuck comprising an outer shell; an interiorly conical sleeve within the shell; an axially apertured holder for the tool shank within the sleeve exteriorly formed for seating on the interiorly conical surface of the sleeve; a spring which presses upon the outer end of the sleeve for forcing it onto the holder, and a centrally apertured screw cap having a central aperture for the tool screwed onto the shell for stopping the spring.

3. A tool-holding chuck comprising an outer shell; an interiorly conical sleeve within the shell; a two-part or longitudinally split holder for the tool shank within the sleeve exteriorly formed for seating on the interiorly conical surface of the sleeve; a spring within the shell pressing upon the outer end of the sleeve for forcing it onto the split holder, and a centrally apertured threaded closure for the shell for stopping the spring.

4. A tool-holding chuck comprising an outer shell; an interiorly conical sleeve within the shell; an axially apertured holder for the tool shank within the sleeve, such holder being longitudinally split and exteriorly formed for seating on the interiorly conical surface of the sleeve; means engaging the upper or inner ends of the two split parts of the split holder with the shell for rotation; a spring in the shell pressing upon the lower end of the sleeve for forcing it yieldingly up onto the split holder for crowding its two parts together, and a centrally apertured closure for the end of the shell threaded for engagement therewith to retain the spring.

5. A tool-holding chuck comprising an outer shell; an interiorly conical sleeve within the shell; a two-part or split holder for gripping the tool shank having an exterior annular boss intermediate its ends for seating on the interiorly conical surface of the sleeve; a spring within the shell pressing upon the lower end of the sleeve to force it yieldingly up onto the two-part holder, and a closure for the shell centrally apertured for the tool and threaded for engagement with the shell for retaining the spring.

6. A tool-holding chuck comprising an outer shell; an interiorly conical sleeve within the shell; a two-part or split holder for gripping the tool shank provided at the upper end with means engaging it with the shell for rotation, such gripper having an exterior annular boss for seating on the interiorly conical surface of the sleeve; a spring within the shell pressing upon the lower end of the sleeve for forcing it yieldingly up onto the holder, and a centrally apertured closure for the shell exteriorly threaded for engagement therewith for retaining the spring.

In testimony whereof, I have hereunto set my hand at Chicago, Illinois, this 24th day of November, A. D., 1906.

WILLIAM L. PROCUNIER.

Witnesses:
EDWARD T. WRAY,
J. S. ABBOTT.